United States Patent [19]

Velger et al.

[11] Patent Number: 5,235,513
[45] Date of Patent: Aug. 10, 1993

[54] AIRCRAFT AUTOMATIC LANDING SYSTEM

[76] Inventors: Mordekhai Velger, 2 Neve Alon Street, Rehovot; Gergory Tocker, 3 Etzel Street, Jerusalem, both of Israel

[21] Appl. No.: 801,630

[22] Filed: Dec. 4, 1991

Related U.S. Application Data

[63] Continuation of Ser. No. 405,193, Sep. 11, 1989, abandoned.

[30] Foreign Application Priority Data

Nov. 2, 1988 [IL] Israel .................................... 88263

[51] Int. Cl.5 .............................................. G01S 1/00
[52] U.S. Cl. .................................. 364/449; 364/434; 342/33; 244/183
[58] Field of Search .............. 364/449, 447, 443, 434, 364/424.01, 424.02; 342/32-34; 244/175, 183, 184

[56] References Cited

U.S. PATENT DOCUMENTS

| | | | |
|---|---|---|---|
| 3,484,549 | 12/1969 | Ricketts et al. | 342/34 X |
| 3,917,196 | 11/1975 | Pond et al. | 244/175 |
| 4,309,758 | 1/1982 | Halsall et al. | 364/424.02 |
| 4,385,354 | 5/1983 | Hornfeld et al. | 244/183 X |
| 4,554,543 | 11/1985 | Wyatt et al. | 244/183 X |
| 4,862,164 | 8/1989 | Croley et al. | 342/33 X |
| 4,866,626 | 9/1989 | Egli | 364/449 |

OTHER PUBLICATIONS

Compeuro '91, May 13-16, 1991, Bologna, Italy 5th Annual European Computer Conference.

Primary Examiner—Jack B. Harvey
Assistant Examiner—E. J. Pipala
Attorney, Agent, or Firm—Keck, Mahin & Cate

[57] ABSTRACT

The invention provides a system for determining the spatial position of a moving object and for guiding its movement, which system comprises a triangular arrangement of three light sources attached to the moving object and facing guidance device, electrooptical sensing device comprising an area imaging device and an image processing computer located at a position facing the moving object, there being provided a guidance computer connected to the image processing computer, and radio-communication device for the exchange of signals from and to said moving object. As an alternative the three light sources can be provided at the ground station and the other components of the system being attached to the moving object, there being provided communication device between said station and object. The system is of special value for guiding manned and unmanned aircraft.

9 Claims, 5 Drawing Sheets

AIRCRAFT AUTOMATIC LANDING SYSTEM

This application is a continuation of application Ser. No. 07/405,193, filed Sep. 11, 1989, now abandoned.

BACKGROUND OF THE INVENTION

The present invention relates to automatic landing of aircraft with the help of a special-purpose electrooptical sensor.

Landing of aircraft in general, and of RPV in particular, is the most difficult step in the operation of aircraft. It requires highly-skilled operators, involves non-negligible risk, and can be performed only in favorable flight conditions.

Currently the RPVs are landed by human operators that either observe it from the land strip or monitor the picture transmitted by a TV camera mounted on board. The guidance commands are radio transmitted to the RPV. Both methods pose considerable difficulties since the pilot is put into unfavorable conditions compared to the operation of ordinary aircraft and receives only incomplete information. In particular, the pilot's perception of the RPV position is limited, he lacks some motion cues, is less percipient of sudden disturbances, etc. The ability to land the RPV in adverse conditions such as bad weather, limited visibility, or at night is severely limited.

Landing of manned aircraft on small airstrips such as aircraft carriers present similar difficulties. The landing platform is very small compared to the typical ground landing strip, so that very accurate guidance to the touch down point is required. The pilot lacks a stationary reference like the horizon or some terrain features; strong wind disturbances are often encountered; the landing process is very short and demands very quick response of the pilot to correct the flight path deviations; and in rough seas the landing platform is moving in six degrees of freedom with considerable amplitude.

PRIOR ART

Various systems have been suggested for automatic landing of aircraft. These systems use the instrument measurement of the aircraft position to keep it on the desired descent trajectory. The measurements used are the readings of the on-board instruments (e.g. altimeter, gyros, and accelerometers), radar readings, or even special-purpose ground-based sensors. The methods and systems described in the literature [Kitten and Fried] are, however, of limited nature since the measurement of the RPV degrees of freedom is incomplete and inaccurate.

In particular, Hornfeld et al describe an automatic landing system based on an additional optical sensor. The system comprises a plurality of infrared fires in a line which extends transversely to the runway, whereby the central one is located at the end of the runway, and an infrared TV camera connected to a computer on board of the aircraft. The camera (sensor) is continuously rotated in such a way that the image of the central fire is obtained in the center of the image plane; the angle of the rotation of the camera is used to determine the deviation of the aircraft relative to the centerline of the runway. The system is supplemented by additional sensing systems such as the laser range finder to find the distance to the aircraft. This method can, basically, be used only to guide the aircraft along a predetermined straight path. The measurement method of gimballing the camera and using the TV tracker is incomplete and introduces large measurement errors, which should prove detrimental to proper guidance.

Other described systems [Urness & Hess, Philips et al.] use radar readings in order to determine the direction and the distance to the approaching aircraft. These systems suffer from the drawbacks mentioned above: the measurements are not accurate and incomplete (only the direction to and the position of the aircraft is provided), and the guidance to the landing is, necessarily, restrictive. Systems of this kind are incapable of providing tight landings, landings on limited strips or on medium- and small-size ships.

The existing automatic landing systems for large commercial or military aircraft, on the other hand, are very expensive and require extensive installation on the landing site.

SUMMARY OF THE INVENTION

The present invention relates to an automatic landing system comprising light sources, an electrooptical sensor and a guidance computer. The novelty of the system is characterized by accurate measurement of all the six degrees of freedom of the aircraft (position and orientation) effected by a single and self-contained sensor and full utilization of this information in controlling the aircraft. On the basis of the measurements the system evaluates the disturbing influences such as atmospheric turbulence or wind gusts and takes them into account. This allows one to guide the aircraft very accurately along the desired trajectory and take any required corrective actions instantaneously.

Amongst the significant advantages are the increased safety of the aircraft and payload; the ability to make the landing very soft (minimizing damage to payload) and very accurate (touch-down in a precise spot); the ability to take full advantage of the capacities of the aircraft by executing very complicated maneuvers not available ordinarily to human operators, as a consequence of which it is possible to minimize the size of the required landing strip and minimize the time spent by the aircraft above the airfield; high update rate, high accuracy, and full computer control makes it possible to land on moving platforms such as small ships provided the information on the ship motion is supplied.

In the preferred embodiment for small unmanned aircraft, such as the majority of current RPVs, the light sources are mounted on the aircraft while the measurement, processing of information, and computation of the guidance commands are performed on the ground; the commands are transmitted to the RPV through the radio link, as it is done in the manual operation mode. This embodiment is suggested as an add-on system designed for minimum intervention with the manual operation mode.

In the embodiment preferred for larger aircraft the light sources are ground based while the sensor and the processing of information is performed on board of the aircraft. This extends the operational range, since much more powerful light sources can be used, and improves the overall performance since the transmission time lags are eliminated. An additional advantage is that the airborne system becomes self-sufficient.

DETAILED DESCRIPTION OF THE INVENTION

Figure 1:
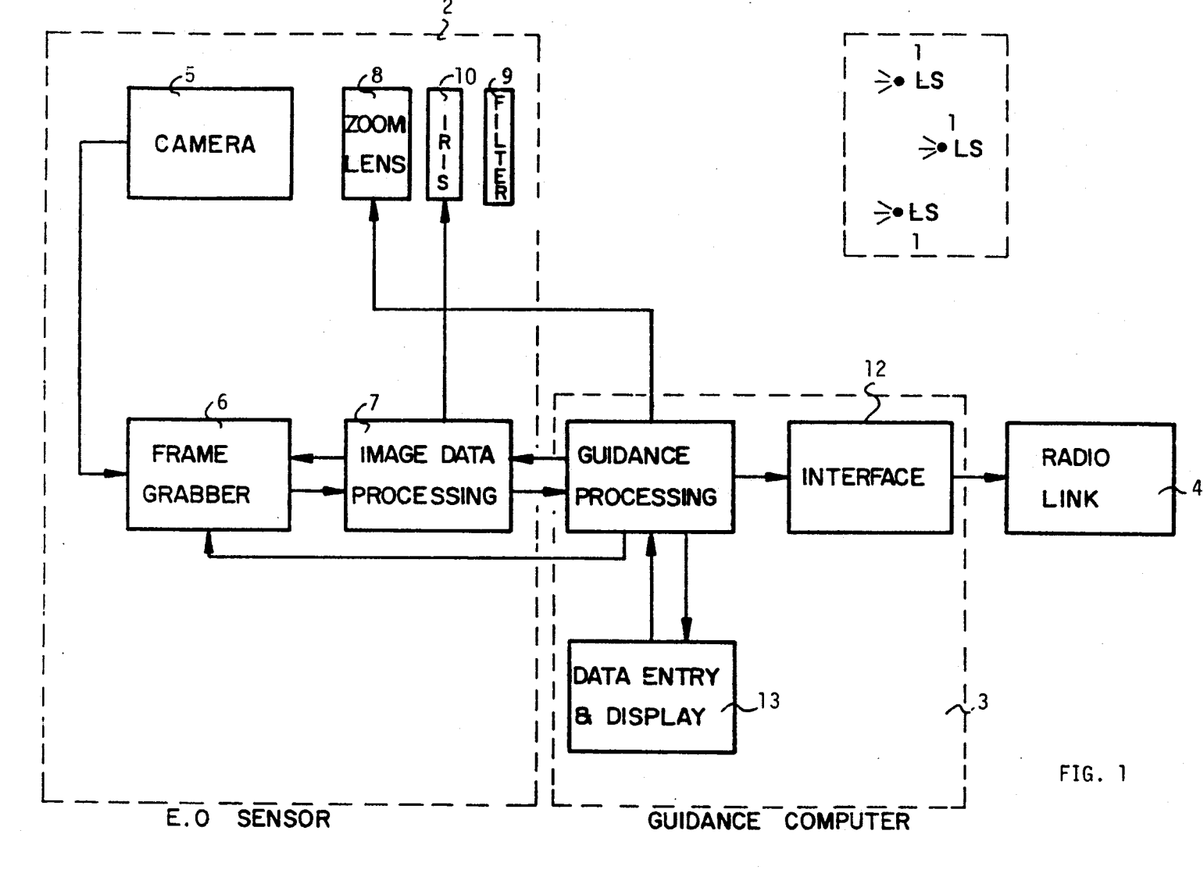
FIG. 1 shows a general block scheme of the automatic landing system, including light sources (1), an electrooptical sensor (2), a guidance computer (3) and a radio link (4).

The present invention relates to a method of guiding and landing aircraft on the basis of accurate measurements of its position and orientation, and to a system for such method. The method is characterized by accurate measurement of all the six degrees of freedom of the aircraft (position and orientation) and full utilization of these in the landing algorithms. The general block scheme of the automatic landing system is shown in FIG. 1. The system comprises, in combination, light sources (1), an electrooptical sensor (2), a guidance computer (3), and a radio link (4). The invention provides two types of configurations: (a) light sources mounted on the aircraft with a ground-based sensor, and (b) an airborne sensor with ground-based light sources, with necessary auxiliary equipment.

The light sources comprise at least three point sources of light (LS) mounted to define a triangle, which must be powerful enough to be detected from sufficiently large distances by the electrooptical sensor.

According to preferred embodiments, the electrooptical sensor (1) comprises a high-resolution area CCD camera (5) and a frame-grabbing card (6) connected to an image data processing computer (7), such as a general-purpose microcomputer or a special card embedded in a larger computer. Such a camera is equipped with a lens (8) providing one or more fields of view, a spectral filter (9), and an autoiris (10). The spectral filter (9) is matched to the spectral band of the light sources (1) employed in order to improve the signal-to-noise and the signal-to-background ratios. The computer-controlled autoiris (10) regulates the received signal whose intensity increases considerably with the approach of the aircraft.

The provision of several fields of view of such a system can be effected by using an appropriate changeable-focus lens (8), or by using several cameras (5) each with a different lens, connected to the same computer.

The image information received by the camera (5) through the frame-grabbing card (6) is processed by the computer (7) in order to determine the coordinates of the images of the light sources; subpixel interpolation is used in order to achieve maximum resolution. The imaging equations are then solved and the three-dimensional coordinates of the light sources relative to the sensor are determined. On the basis of these coordinates the position and orientation of the aircraft are determined. It is an important feature of the system of the present invention, that it is designed so as to achieve highly accurate measurements of the all the six degrees of freedom of the aircraft.

The measurements of the position and orientation of the aircraft, which can be sampled at the TV rate or at a higher rate, are passed to the guidance computer (11). The computer uses filtering techniques based on the model of the aircraft dynamics in order to reconstruct the aircraft trajectory and to evaluate any disturbances (such as wind gusts). The deviations from the desired optimal landing trajectory are computed, and the corresponding guidance commands are issued.

In the configuration with a ground-based sensor, the guidance commands are transmitted to the aircraft by the radio link (4) through an appropriate interface (12). In the reverse configuration, the radio link is used to transmit optional information to the ground control station. Provision is made to supply various technical data to the automatic landing system by means of the terminal (13), such as the identification of the type of the approaching aircraft, general weather conditions, type of the desired landing trajectory, etc. The terminal (13) is also to display back the flight information to the operators, such as exact position of the aircraft, the aircraft speed and sinking rate, any deviations from the landing trajectory, wind and turbulence disturbances as measured by the system, and the position of the expected touch down point. The terminal can also used to transmit the abort command in unexpected emergency situations.

The system is utilizing the existing autopilot systems of the aircraft, but is designed to fully replace same in various failure modes or in the absence of the autopilot.

Figure 2:
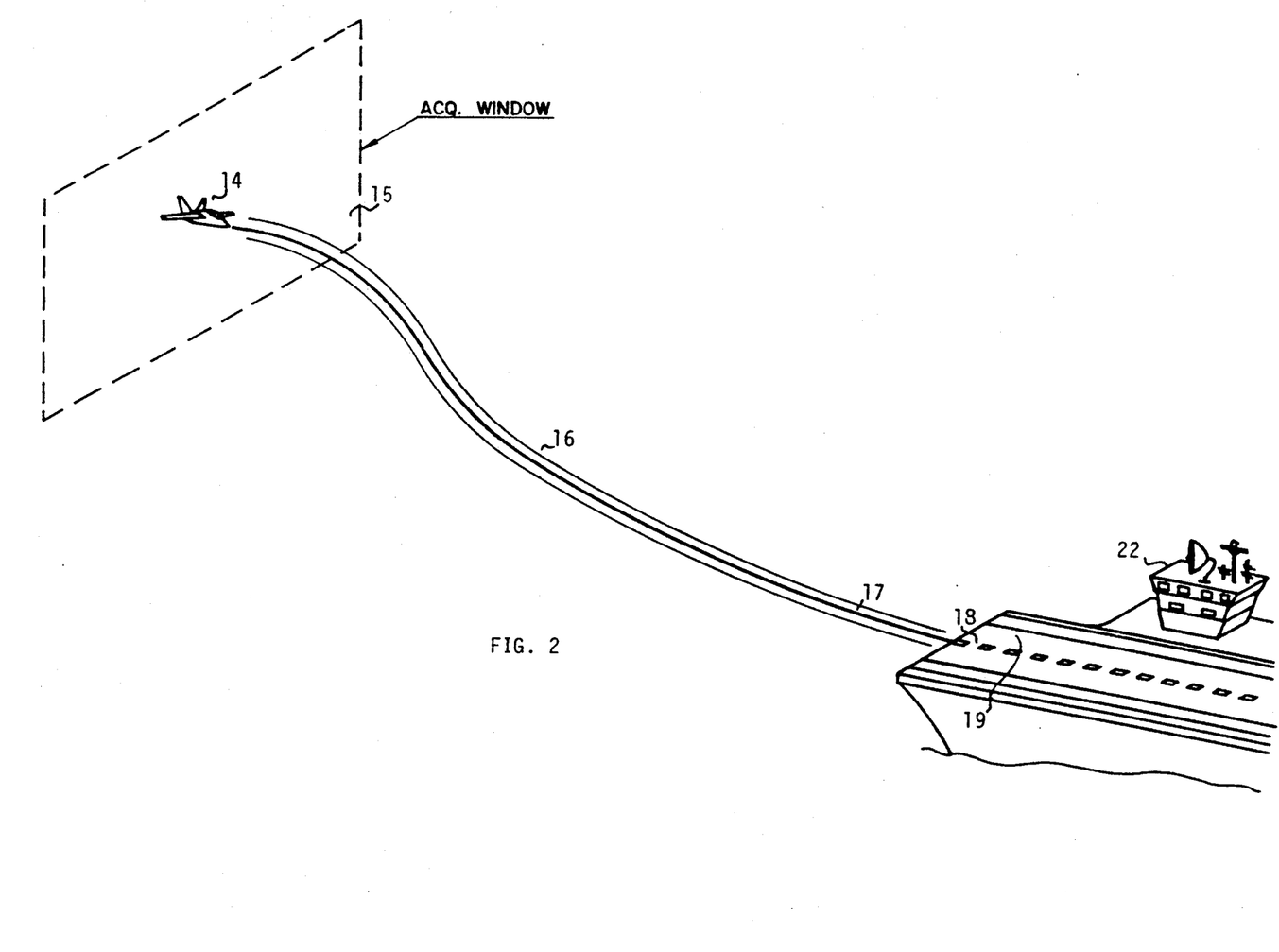
FIG. 2 shows the process of landing an aircraft with the help of the system of FIG. 1.

The process of landing aircraft with the help of the system is depicted in FIG. 2. The aircraft (14) is brought to the vicinity of the landing site by independent means, and is guided into the acquisition box (15) of the automatic landing system at the maximum acquisition range. The acquisition range is defined by the detectability of the light sources by the system, and the dimensions of the acquisition box correspond to the field of view. The acquisition range and the dimensions of the acquisition box are designed in accordance with the size and type of the aircraft, the independent navigation means used to guide the aircraft into the acquisition box, and the specifics of the landing site. Typically, the system will function with two fields of view, a wide field of view for the initial acquisition, and a narrow field of view for accurate measurement. The system will acquire the target in the wide field of view, where at large distance only the measurement of the height and lateral displacement are possible, and will guide it along the descent trajectory (16) to the gliding slope (17) in the center of the field of view, where it will switch to the narrow field of view. Once in the narrow field of view, accurate measurements of all the six degrees of freedom are effected and the guidance of the aircraft is changed accordingly. At very short ranges the system may switch again to the wide field of view since in the narrow field of view the size of the image may become too large. The system guides the aircraft to the touch down point (18) and full stopping of the aircraft, typically by the arresting cable (19).

During the guidance process the system estimates constantly the expected trajectory of the aircraft, which is calculated so as to be the closest to the optimal landing trajectory given the actual disturbances, and calculates the position of the expected touch down point as well as the aircraft speed and sinking velocity. In the case where any of these critical parameters exceed the allowed limits, or if an emergence abort command is received from the human operators, the system aborts the mission and commands the autopilot of the aircraft to gain safe altitude and transmits the control to the control station. Typically, the aircraft will be made to complete a go-around circle around the landing strip and will be brought again into the acquisition box so that the automatic landing will be retried. The data entry and display terminal (13) is designed in such a way that a human operator can take over the control at any desired moment. The terminal (13) is located inside the ground control station (22), being connected to the electro-optical sensor (2) and the guidance computer (3) by means of a connecting cable (23). The data entry terminal (13) can by equipped with a highest-priority joystick for taking over the control by a human operator in emergency situations.

Figure 3:
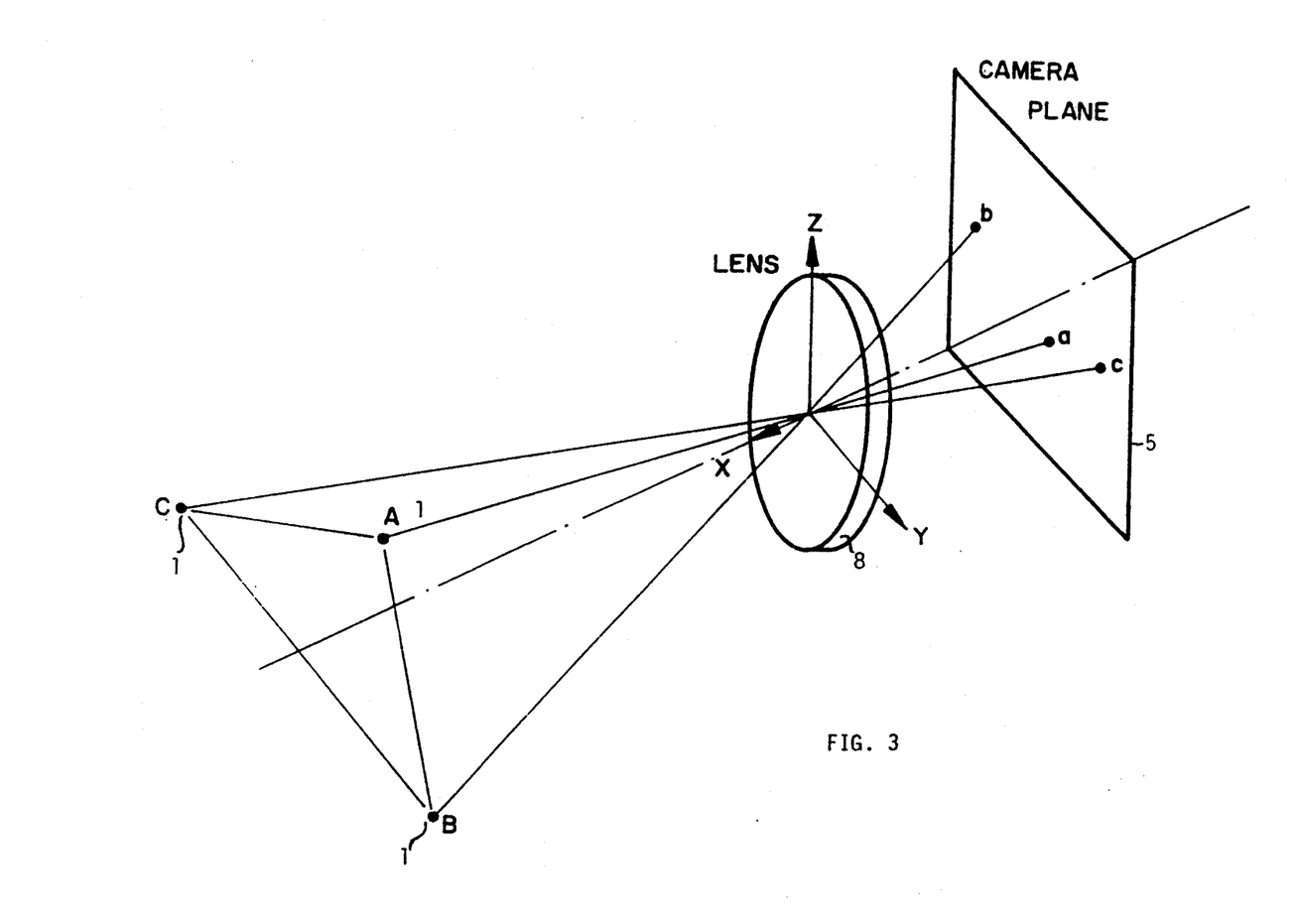
FIG. 3 shows the imaging geometry of the automatic landing system.

The imaging geometry is shown in FIG. 3, where A, B, and C are the light sources and a, b, and c are their images in the camera chip plane. Denoting by $x_A$, $y_A$, $z_A$, ..., $x_C$, $y_C$, $z_C$ the coordinates of the light sources, and denoting by $y_a$, $z_a$, ..., $y_c$, $z_c$ the coordinate of their images, the imaging equations read $$y_a = -f \frac{y_A}{x_A}, y_b = -f \frac{y_B}{x_B}, y_c = -f \frac{y_C}{x_C}$$

$$z_a = -f \frac{z_A}{x_A}, z_b = -f \frac{z_B}{x_B}, z_c = -f \frac{z_C}{x_C}$$

where f is the focal length of the lens. On the other hand, the three relative distances $r_{AB}$, $r_{BC}$, and $r_{AC}$ between the light sources A, B, and C can also be expressed in terms of the coordinates:

$$r_{AB} = \sqrt{(x_B - x_A)^2 + (y_B - y_A)^2 + (z_B - z_A)^2}$$

$$r_{BC} = \sqrt{(x_C - x_B)^2 + (y_C - y_B)^2 + (z_C - z_B)^2}$$

$$r_{AC} = \sqrt{(x_C - x_A)^2 + (y_C - y_A)^2 + (z_C - z_A)^2}$$

The result is a system of nine equations for the nine unknown coordinates of the light sources. This system can be solved knowing the coordinates of the light source images, provided the light sources are not collinear. In the practical conditions encountered in the operation of the automatic landing systems, the solution is unique. The coordinates of the images in the camera chip plane are obtained by image processing of the pixel information. Namely, the video output of the camera is digitized and stored in the computer memory with each number corresponding to the light intensity in the appropriate picture element (pixel). The pixels corresponding to the light source images are detected by thresholding, and centroid interpolation is used for determination of the image position. The interpolation results in superresolution-positional resolution better than pixel size.

The critical system parameters are the range, total field of view, and the measurement accuracy. The former two parameters are a consequence of the operational requirements of the concrete application, viz., type of aircraft, size and type of landing strip, operating conditions, type and availability of independent navigational means, etc. For the RPVs the typical range is 1-2 km, and the total field of view is of the order 20 degrees. The requirement of a certain measurement accuracy is dictated by the considerations of the guidance and control: the better the measurement accuracy, the more reliable control. Simulation of the RPV landing shows that a measurement accuracy of ~3 mrad is sufficient to achieve very reliable control of the RPV and ensure very accurate landing. The accuracy achievable in a concrete design is mainly dependent on the range and field of view. In order to achieve the required accuracy at large ranges the system will typically employ a second narrow field of view.

Figure 4:
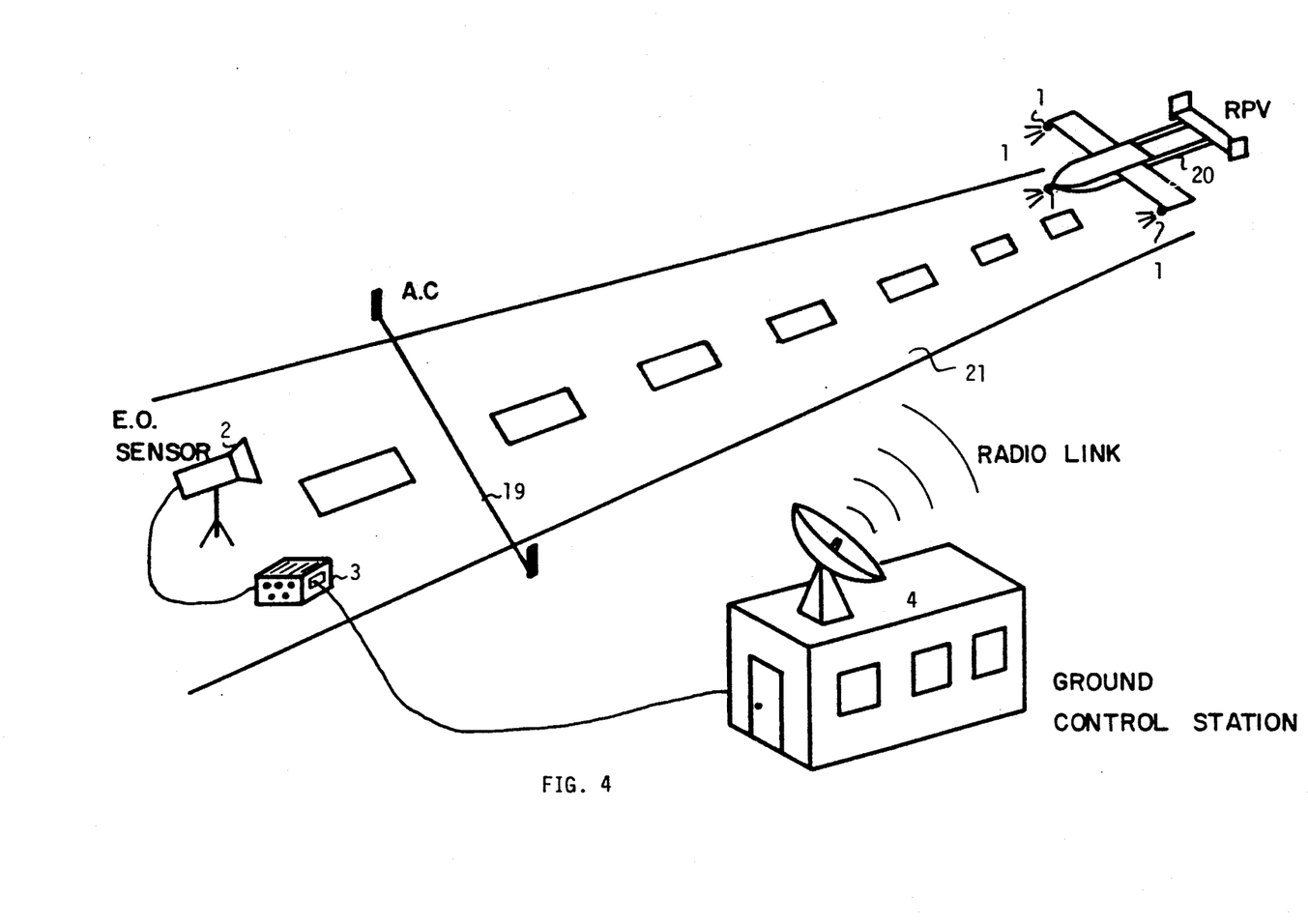
FIG. 4 shows a preferred configuration for RPVs.

In the preferred configuration for RPVs, shown in FIG. 4, the light sources (1) are preferably powerful laser diodes mounted on the RPV (20), and the sensor (2) and the computer (3) are placed on the ground, at the end of the landing strip (21) behind the arresting cable (19). The diodes chosen were the 500 mW laser diodes such as the SLD303 diodes of SONY operating in the continuous-wave mode, and they were mounted on the nose and the wing tips of the aircraft. The diodes were equipped with cylindrical lenses in order to achieve an emission angle of 20 by 20 degrees; the CCD camera was Pulnix TM 865 camera possessing 800 by 590 photosensitive elements; the lens was capable of providing two focal lengths, 35 mm and 170 mm, and was equipped with a computer-controlled autoiris; the frame grabber was the PC Vision Plus card by Imaging Technologies Inc.,; and the data processing and the guidance computer was an IBM PC compatible. The bandwidth of the spectral filter of the camera was matched to the emission wave length of the diodes. The diodes mounted on the aircraft define a triangle with a 5 m base and 2 m height. The two focal lengths of the lens define the two fields of view, a wide one, of 15 by 12 degrees, and a narrow one, of 2 by 3 degrees. The maximum range of the system is, depending on the atmospheric visibility conditions, 1500-2000 m, and the measurement accuracy in the narrow field of view is of the order 3 mrad.

The system acquires the target in the wide field of view at the maximum range, with the aircraft flying horizontally towards the sensor at a cruising altitude of, approximately, 300 m. Only the measurement of the altitude and lateral position of the RPV are provided. On the basis of this information, the RPV is guided down to the gliding slope to the center of the field of view. Once this is achieved, the system switches to the narrow field of view and starts providing accurate measurements of all the six degrees of freedom. This transition occurs at a distance of 1000-1500 m and altitude ~100 m. At a distance of 250 m the system switches back to the wide field of view which is now sufficiently accurate. The landing accuracy is better than 1 m laterally, 2 m longitudinally, and 3 degrees in the roll and azimuth angles.

This configuration is designed as an add-on system for minimum interference with the existing configuration of the RPV and its mode of operation, and with the requirement of the minimum additional weight and power demands on the aircraft. The computer calculated guidance commands are transmitted to the RPV by a radio link (4) in place of the joystick commands of the human operator.

Figure 5:
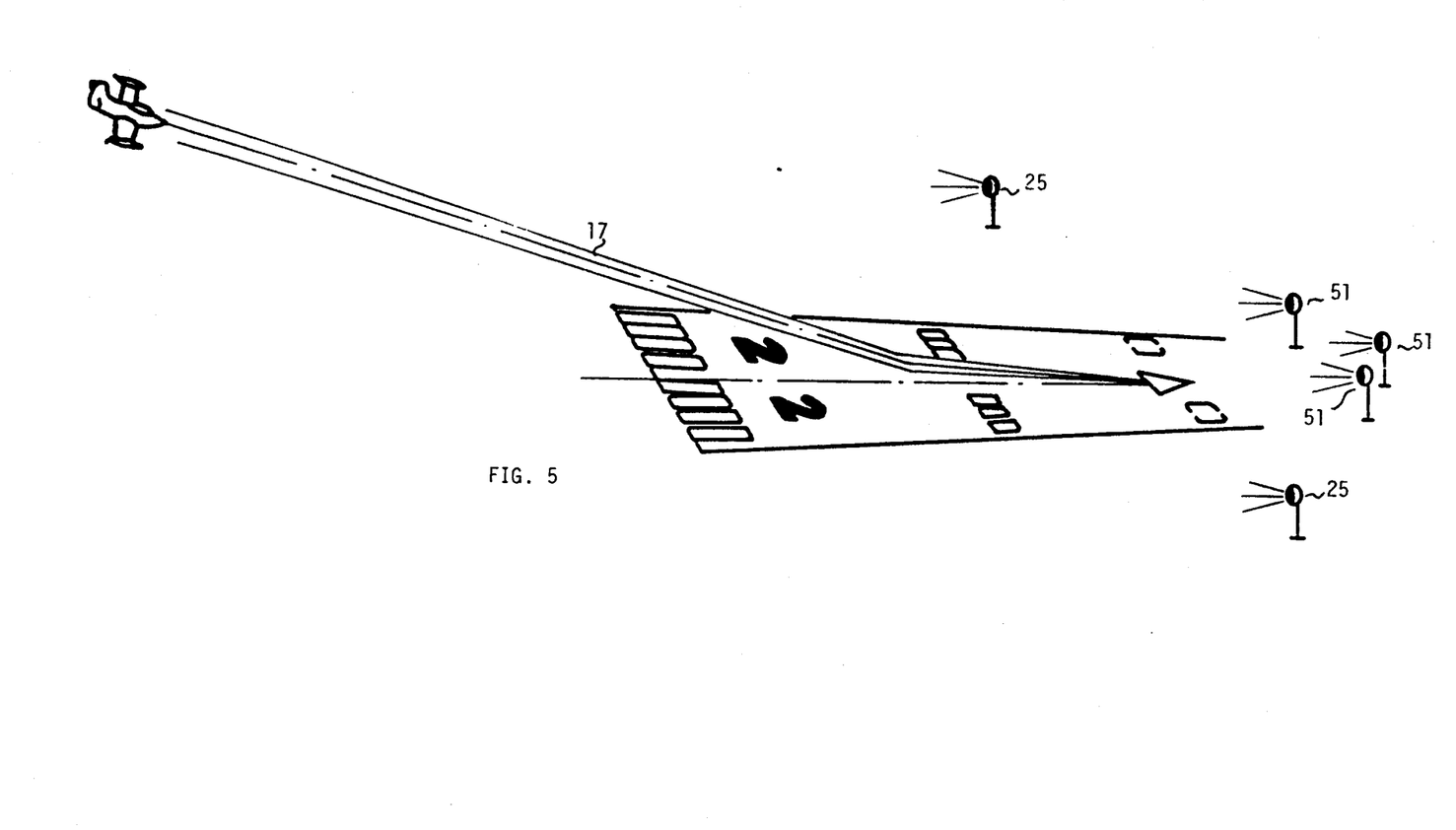
FIG. 5 shows a preferred embodiment for larger aircraft where larger acquisition ranges are desired, and where there is less emphasis on the minimum weight of the airborne parts.

In the preferred embodiment for larger aircraft, shown in FIG. 5, where larger acquisition ranges are required and where there is less emphasis on the minimum weight of airborne parts, the light sources 51 are based on the ground and the camera and the computer are on board. Two of the possible options are specifically mentioned, (a) a configuration with three powerful projectors (24) placed on the landing strip behind the arresting cable and arranged in the triangle, and the airborne sensor equipped with two fields of view, much like the configuration for the RPVs but in the reverse mode; and (b) a configuration with additional two powerful projectors (25) placed so as to form an additional extended triangle and to eliminate the need for two fields of view of the airborne sensor. In this latter configuration, the system acquires the target according to the small triangle, guides the aircraft to the gliding slope (17) where the extended triangle will also become visible so that full accurate measurements become possible, and switches eventually to the measurements according to the small triangle (21) at very close ranges. In order to facilitate the identification of the small triangle during the target acquisition, only the projectors (21) can operate initially, and the projectors (24) will be switched on at the next step. Alternatively, the discrimination between the triangles is performed by image processing, based on the number and relative positions of the observed images.

The former configuration is preferable for landing of larger aircraft on very small airstrips, where it is not possible to form the extended triangle because of space limitations, such as landing on aircraft carriers.

The sensor in these embodiments is the same as in the RPV example with the provision that the corresponding lens has the fields of view 10 by 8 degrees and 1.5 by 1 degrees (in the former configuration); the light sources are high power projectors of 1000 Watts. The electrooptical sensor is fixed-mounted on the aircraft and the computer with all the support electronics is also placed on board.

The system operates in a way similar to the way described above for the RPV case; in this case, however, the acquisition range is 3000–4000 m, and cruising altitude is 600 m.

Although exemplified with reference to a landing system of aircraft of various types, including RPVs, it is clear that the system of the invention is suited for the determination of the spatial position of a moving object and its trajectory, and for the guidance of its movement. The basis is the provision of the system of three light sources in a triangle either attached to the object or at a guidance station, with the provision of electrooptical sensing means and auxiliaries, including a radio-link, said sensor being at the control station or on said object, respectively.

We claim:

1. An automatic landing system for determining spacial position and guidance of movement of an aircraft comprising:

a light emitter mountable on one of an aircraft and ground station consisting of three lights of preselected spectral band fixed in a triangular optical relationship and receiver means for receiving landing trajectory signals from the other of an aircraft and a ground station;

a receiver mountable on the other of an aircraft and ground station comprising an electro optical sensor means including camera means having a spectral filter matched to the spectral band of the three lights for detecting light emanating from the three lights and an iris for receiving light from the spectral filter to regulate the intensity of the light detected by the spectral filter, and lens means for changing the field of view of the spectral filter and iris, said camera means producing an output signal correlated with light detected by the spectral filter;

frame grabber means for receiving the output signal from the camera means and providing an output; and an image data processor receiving the output of the frame grabber means for controlling the iris and the lens means and for determining relative position and orientation of the light emitter in all six degrees of freedom based solely on the light detected from the three lights;

guidance means connected to the image data processor for evaluating disturbances and reconstructing a landing trajectory based upon deviations from a desired optical landing trajectory and for developing an output relative thereto; and means responsive to the output of the guidance means for guiding the aircraft to a desired landing.

2. An automatic landing system as claimed in claim 1, wherein a terminal means is provided for inputting data for use by the processing means in reconstructing a landing trajectory and for displaying flight information to an operator of the terminal means.

3. An automatic landing system as claimed in claim 1, wherein the field of view of the camera means is changeable between a wide field of view and a narrow field of view.

4. An automatic landing system as claimed in claim 3, wherein the wide field of view is 15 by 12 degrees and the narrow field of view is 2 by 3 degrees when the light emitter is mounted on an aircraft.

5. An automatic landing system as claimed in claim 3, wherein the wide field of view is 10 by 8 degrees and the narrow field of view is 1.5 by 1 degree when the light emitter is mounted on a ground station.

6. An automatic landing system as claimed in claim 1, wherein the three lights of the light emitter are laser diodes.

7. An automatic landing system as claimed in claim 6 wherein cylindrical lenses able to achieve an emission angle of 20 by 20 degrees coact with the laser diodes.

8. An automatic landing system as claimed in claim 1, wherein the camera is a charged coupled device (CCD) camera.

9. An automatic landing system as claimed in claim 1, wherein the triangular optical relationship of the three lights defines a triangle having a base of about at least 5 meters and a height of about at least 2 meters.

* * * * *

UNITED STATES PATENT AND TRADEMARK OFFICE
CERTIFICATE OF CORRECTION

PATENT NO.  : 5,235,513
DATED       : August 10, 1993
INVENTOR(S) : Mordekhai VELGER et al.

It is certified that error appears in the above-identified patent and that said Letters Patent is hereby corrected as shown below:

On title page,
item [76], change "Gergory Tocker" to --Gregory Toker--.

Signed and Sealed this

Twenty-second Day of March, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,235,513                                      Page 1 of 2
DATED     : 10-19-93
INVENTOR(S) : Van Arsdale, et al It is certified that error appears in the above-indentified patent and that said Letters Patent is hereby corrected as shown below:

Col. 2, line 67, "A," should be -- $A_r$ --.

Col. 3, line 29, "ϕ" should be -- φ --.

Col. 3, line 30, "7)" should be -- (7) --.

Col. 3, line 31, "ϕ" should be -- φ --.

Col. 3, line 36, "ϕ" should be -- φ --.

Col. 3, line 39, "ϕ" should be -- φ --.

Col. 4, line 21, "fluid" should be -- liquid --.

Col. 4, line 38, "means" should be -- mean --.

UNITED STATES PATENT AND TRADEMARK OFFICE
CERTIFICATE OF CORRECTION

PATENT NO. : 5,235,513

DATED : 10-19-93

INVENTOR(S) : Van Arsdale, et al

It is certified that error appears in the above-indentified patent and that said Letters Patent is hereby corrected as shown below:

Col. 4, line 60, "φ" should be -- φ --.

Col. 4, line 63, "φ" should be -- φ --.

Col. 4, line 63, "φ" should be -- φ --.

Signed and Sealed this

Thirty-first Day of May, 1994

Attest:

BRUCE LEHMAN

*Attesting Officer*     *Commissioner of Patents and Trademarks*